US012286948B2

(12) United States Patent
Lesieur et al.

(10) Patent No.: US 12,286,948 B2
(45) Date of Patent: Apr. 29, 2025

(54) FUEL PUMP

(71) Applicant: PHINIA DELPHI LUXEMBOURG SARL, Belvaux (LU)

(72) Inventors: Cyrille Lesieur, Avaray (FR); Christophe Breant, Olivet (FR)

(73) Assignee: PHINIA DELPHI LUXEMBOURG SARL, Belvaux (LU)

( * ) Notice: Subject to any disclaimer, the term of this patent is extended or adjusted under 35 U.S.C. 154(b) by 0 days.

(21) Appl. No.: 18/717,822

(22) PCT Filed: Dec. 9, 2022

(86) PCT No.: PCT/EP2022/085112

§ 371 (c)(1),
(2) Date: Jun. 7, 2024

(87) PCT Pub. No.: WO2023/105024

PCT Pub. Date: Jun. 15, 2023

(65) Prior Publication Data

US 2025/0043758 A1 Feb. 6, 2025

(30) Foreign Application Priority Data

Dec. 10, 2021 (GB) ..................................... 2117847

(51) Int. Cl.

*F02B 3/00* (2006.01)
*F02M 59/02* (2006.01)
*F02M 59/46* (2006.01)

(52) U.S. Cl.

CPC ........ *F02M 59/025* (2013.01); *F02M 59/466* (2013.01)

(58) Field of Classification Search

CPC .. F02M 59/368; F02M 59/366; F02M 59/367; F02M 59/466; F02M 2200/09;

(Continued)

(56) References Cited

U.S. PATENT DOCUMENTS 10,871,136 B2 * 12/2020 Dauer .................. F02M 59/366
2012/0255636 A1 * 10/2012 Mancini ............... F02M 59/466 137/565.16

(Continued)

FOREIGN PATENT DOCUMENTS

EP 3591214 A1 1/2020
KR 20130010933 A 1/2013

OTHER PUBLICATIONS

International Search Report for PCT/EP2022/085112 dated Apr. 11, 2023, 3 pages.

(Continued)

*Primary Examiner* — Long T Tran
*Assistant Examiner* — James J Kim
(74) *Attorney, Agent, or Firm* — Warner Nocross + Judd LLP

(57) ABSTRACT

A GDi fuel pump comprising an inlet valve assembly arranged in an inlet passage of the pump housing. The inlet valve assembly comprises a check valve comprising a seat member cooperating with a valve member; and an actuator assembly having a needle assembly reciprocally moveable by means of a magnetic field to actuated the valve member. The needle assembly includes an actuating needle, an armature, a washer with a plurality of through holes and an obturating member. The obturating member comprises a plurality of flexible blades, each blade comprising an obturating pad configured to be moveable between a rest position, wherein the obturating pad rests on the washer and closes a respective through hole thereof, and a raised position, raised from the washer when the needle moves away from the check valve. Each obturating pad comprises a plurality of openings, the cumulative cross-sections of the openings in a respective pad representing a fraction of the flow cross-section through the respective hole in the washer.

15 Claims, 5 Drawing Sheets

(58) Field of Classification Search
CPC .. F02M 59/464; F02M 63/0022; F02M 55/04; F02M 37/0041
USPC .......................................................... 123/294
See application file for complete search history.

(56) References Cited

U.S. PATENT DOCUMENTS

| | | | | |
|---|---|---|---|---|
| 2016/0237973 | A1 | 8/2016 | Bleeck et al. | |
| 2020/0173391 | A1* | 6/2020 | Perry .................. | F02M 59/464 |

OTHER PUBLICATIONS

Machine assisted English translation of KR20130010933A obtained from https://worldwide.espacenet.com/patent on Jun. 6, 2024, 8 pages.

* cited by examiner

FUEL PUMP

CROSS-REFERENCE TO RELATED APPLICATIONS

This application is the U.S. National Stage of International Application No. PCT/EP2022/085112 filed on 9 Dec. 2022, which claims priority to and all advantages of United Kingdom Application No. 2117847.0 filed on 10 Dec. 2021, the contents of which are incorporated herein by reference.

FIELD OF THE INVENTION

The present invention generally relates to fuel injection in internal combustion engines and more specifically to a fuel pump.

BACKGROUND OF THE INVENTION

Fuel systems in modern internal combustion engines fueled by gasoline, particularly for use in the automotive market, employ gasoline direct injection (GDi) where fuel injectors inject fuel directly into combustion chambers of the internal combustion engine. In such systems employing GDi, fuel from a fuel tank is supplied under relatively low pressure by a low-pressure fuel pump which is typically an electric fuel pump located within the fuel tank. The low-pressure fuel pump supplies the fuel to a high-pressure fuel pump—the GDi pump—which typically includes a pumping plunger which is reciprocated by a camshaft of the internal combustion engine in order to cyclically vary the volume of a compression chamber. Reciprocation of the pumping plunger further pressurizes the fuel in order to be supplied to fuel injectors which inject the fuel directly into the combustion chambers of the internal combustion engine.

Such GDi pump, as e.g. disclosed in EP 3 591 214 A1, conventionally comprises a solenoid actuated inlet valve assembly and an outlet check valve assembly, respectively arranged in inlet and outlet ducts opening in the compression chamber. The inlet valve assembly comprises a valve seat member with through holes that cooperates with a flexible shutter situated on a first side of the valve seat member (facing the compression chamber). The shutter is actuated by means of a needle assembly from the second side of the valve seat member, through a central passage therein. The needle assembly includes an armature that is attracted by the magnetic field generated by a coil assembly with pole piece, when energized. The needle assembly is spring biased toward the valve seat member and lifts off the shutter, whereby the inlet valve assembly is open by default allowing fuel to enter the compression chamber. Energizing the coil assembly will retract the needle assembly, typically during a compression phase, allowing the shutter to come into seated position and close the holes in the valve seat member. It has been observed that some small particles, including some metallic particles, may be carried by the inlet fuel flow and collect within inlet fuel assembly. These particles may alter operation of the pump, since they tend, due to the movement of the needle assembly, to be 'vacuumed' in the air gap between the needle armature and pole piece. After a critical amount of particles have accumulated in the air gap, they get hammered by the armature and will eventually block the inlet valve assembly.

OBJECT OF THE INVENTION

The object of the present invention is to provide a fuel pump with an improved inlet valve assembly, which is less prone to malfunction due to pollution carried by the fuel.

This object is achieved by a fuel pump as claimed in claim 1.

SUMMARY OF THE INVENTION

The present invention relates to a fuel pump comprising:

a housing provided with a pumping bore extending along a pumping axis and defining, at an end, a compression chamber which volume is cyclically varied by a piston reciprocating in the pumping bore;

an inlet passage in the housing in communication with a fuel supply passage;

an outlet passage in the housing, in which an outlet valve assembly is arranged and selectively discharges high pressure fuel; and an inlet valve assembly arranged in the inlet passage and configured to selectively allow low-pressure fuel to enter the pumping chamber.

The inlet valve assembly comprises: a check valve comprising a seat member with at least one outlet passage therethrough cooperating with a valve member moveable between a seated position preventing flow through the at least one outlet passage and an unseated position permitting flow through the latter; and an actuator assembly comprising an actuating needle reciprocally moveable by means of a magnetic field to actuate the valve member between the seated and unseated positions, wherein the actuating needle is part of a needle assembly including an armature, a washer with a plurality of through holes and an obturating member;

wherein the obturating member comprises a plurality of flexible blades, each blade comprising an obturating pad configured to be moveable between a rest position, wherein the obturating pad rests on said washer and closes a respective through hole thereof, and a raised position, raised from said washer when said needle moves away from said check valve.

It will be appreciated that each obturating pad comprises a plurality of openings, the cumulative cross-sections of the openings in a respective pad representing a fraction of the flow cross-section through the respective hole in the washer.

In embodiments, the cumulative cross-section of the openings in a respective pad represents less than 70% of the flow cross-section through the respective hole, in particular less than 60, 50, 40 or 35%.

The obturating member combined with the washer allows modifying the flow behavior through the needle assembly depending on the direction of actuation of the latter. When the pads are raised, a greater flow cross section is allowed through the holes of the washer, whereby the needle assembly move at greater speed. Comparatively, when needle assembly moves in a direction that applies the pads on the washer, the flow cross-section through the washer holes is defined by the openings in the pads. Hence only a fraction of the washer's flow cross-section is available, opposing a greater resistance to the fluid, whereby the needle assembly moves at comparatively reduced speed.

It will be appreciated that the pads are provided with a plurality of openings. The use of a number of openings, instead of e.g. a single opening, allows having smaller openings in the pad. With lower dimensions of the openings, only smaller particles may flow through the washer towards the actuating region of the inlet valve. In other words, a plurality of openings may have a reduced size compared to a single opening, thus limiting the flow of particulate pollution through the washer.

In embodiments, each opening in the pad is dimensioned to prevent passage of particles with a diameter from 280 or 300 μm and greater.

In embodiments, the obturating member is mounted to the washer on the side thereof turned towards the check valve. The pads will thus close the washer holes when the needle assembly moves towards the check valve.

In embodiments, the pad openings are of circular shape; other shapes may however be contemplated, as determined appropriate by those skilled in the art.

They may have a diameter of less than 320 μm, preferably less than 300 μm, in particular less than 280 μm. Alternatively they may have a diameter in the range of 170 to 300 μm, preferably 190 and 275 μm.

In embodiments, each pad comprises three openings with a diameter of about 250 to 270 μm.

In embodiments, each pad comprises four openings with a diameter of about 220 to 230 μm.

In embodiments, each pad comprises five openings with a diameter of about 190 to 210 μm.

In embodiments, the pads may comprise a number of slit-shaped openings distributed on the pad. The slit-shaped openings may e.g. be disposed in a parallel manner, or in a square or cross. The slit-shaped holes may be straight or curved and present a width of less than 50 μm.

Advantageously, the obturating member comprises a base portion fixed to the washer, wherein each pad is attached to the base portion by a flexible stem. The base portion may be annular and extend peripherally on the washer, surrounding the holes therein.

Conventionally, the inlet valve assembly may comprise a spring biasing the needle assembly towards the valve seat in order to maintain the valve member in unseated position (i.e. open by default). Actuation of the inlet valve assembly is done by means of a solenoid assembly with a coil surrounding a pole piece, configured to selectively generate a magnetic field adapted to attract the armature and hence pull the needle assembly away from the seat member to bring the valve member in seated position.

The present fuel pump is adapted for use as high-pressure fuel pump, in particular as GDi fuel pump.

BRIEF DESCRIPTION OF THE DRAWINGS

The present invention will now be described, by way of example, with reference to the accompanying drawings, in which.

DETAILED DESCRIPTION OF PREFERRED EMBODIMENTS

Figure 1:
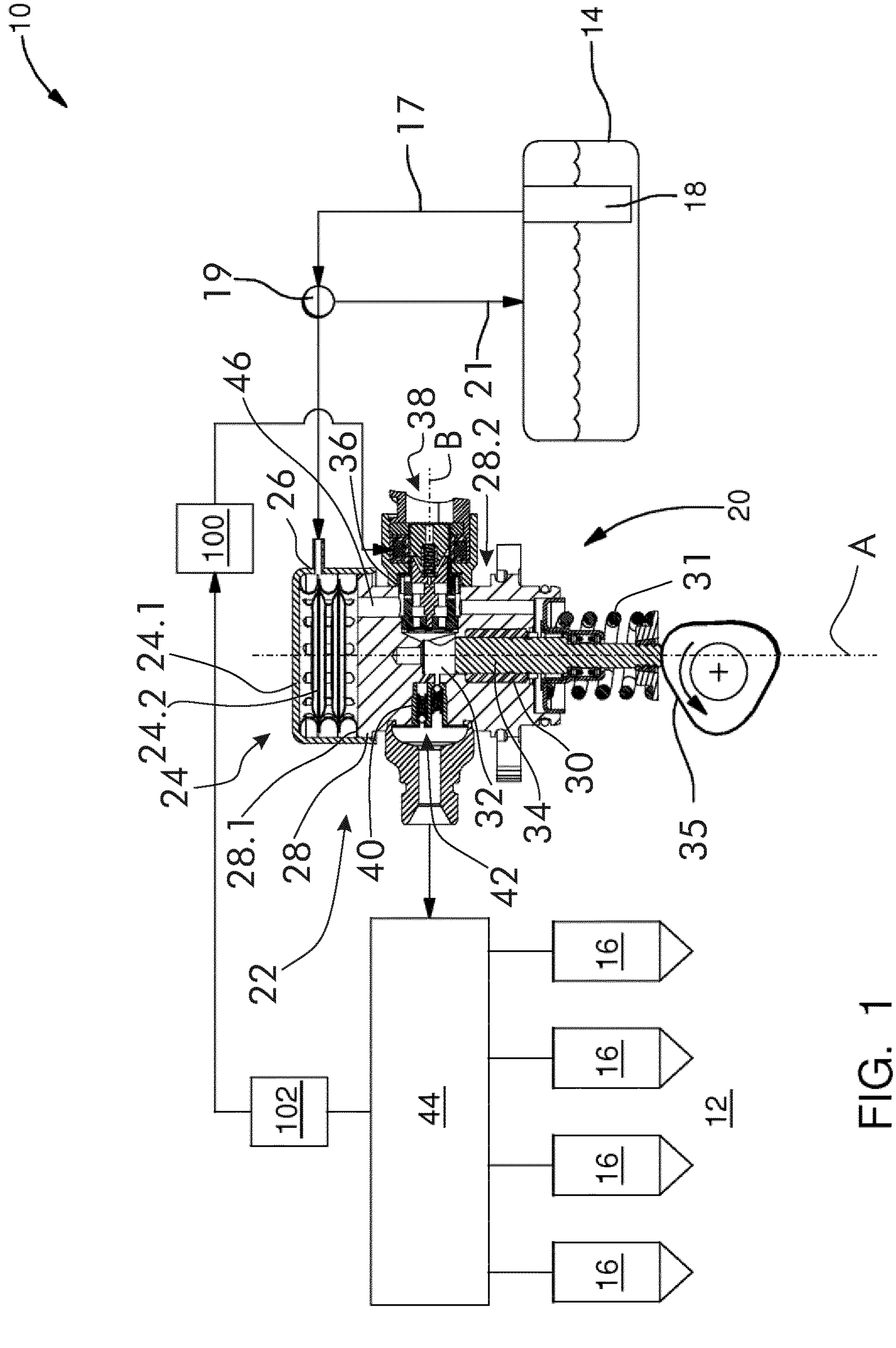
FIG. 1: is a schematic view of a fuel system including a fuel pump in accordance with the present invention.

In accordance with an embodiment of this invention and referring initially to FIG. 1, a fuel system 10 for an internal combustion engine 12, in particular GDi engine, is shown is schematic form. Fuel system 10 generally includes a fuel tank 14 which holds a volume of fuel to be supplied to internal combustion engine 12 for operation thereof; a plurality of fuel injectors 16 which inject fuel directly into respective combustion chambers (not shown) of internal combustion engine 12; a low-pressure fuel pump 18; and a high-pressure fuel pump 20. The low-pressure fuel pump 18 draws fuel from fuel tank 14 and elevates the pressure of the fuel for delivery to high-pressure fuel pump 20 where the high-pressure fuel pump 20 further elevates the pressure of the fuel for delivery to fuel injectors 16 via a fuel rail 44. By way of non-limiting example only, low-pressure fuel pump 18 may elevate the pressure of the fuel to about 500 kPa or less and high-pressure fuel pump 20 may elevate the pressure of the fuel to above about 10 MPa and may be about 60 MPa depending on the operational needs of the internal combustion engine. While four fuel injectors 16 have been illustrated, it should be understood that a lesser or greater number of fuel injectors 16 may be provided.

As shown, low-pressure fuel pump 18 may be provided within fuel tank 14, however low-pressure fuel pump 18 may alternatively be provided outside of fuel tank 14. Low-pressure fuel pump 18 may be an electric fuel pump as are well known to a practitioner of ordinary skill in the art. A low-pressure fuel supply passage 17 provides fluid communication from low-pressure fuel pump 18 to high-pressure fuel pump 20. A fuel pressure regulator 19 may be provided such that fuel pressure regulator 19 maintains a substantially uniform pressure within low-pressure fuel supply passage 17 by returning a portion of the fuel supplied by low-pressure fuel pump 18 to fuel tank 14 through a fuel return passage 21. While fuel pressure regulator 19 has been illustrated in low-pressure fuel supply passage 17 outside of fuel tank 14, it should be understood that fuel pressure regulator 19 may be located within fuel tank 14 and may be integrated with low-pressure fuel pump 18.

Referring still to FIG. 1, fuel pump 20 includes a pressurizing unit 22 on which a damper 24 is arranged. The damper 24 is housed in a cylindrical can 24.1 provided with a hole forming a fuel inlet 26. Inside can 24.1 is arranged a pair of flat deformable capsules 24.2 that deform and damp fluid waves propagating in the low-pressure circuit.

The pressurizing unit 22 has a housing or body 28 having a top face 28.1, on which is fixed the damper 24, and peripheral faces 28.2. The body 28 is provided with a pumping bore 30 extending along a pumping axis A and extending between a blind end defining a compression chamber 32 and an opening in the bottom side of the pressurizing unit 22. The body 28 is typically made from metal, in particular stainless steel.

In pumping bore 30, a piston or plunger 34 is guided to perform reciprocal displacements varying the volume of the compression chamber 32 and, in the compression chamber 32 open an inlet conduit 36 (or passage) controlled by an inlet valve assembly 38 and an outlet conduit 40 (or passage) controlled by an outlet valve assembly 42. The inlet conduit 36 extends from a peripheral face 28.2 of the pressurizing unit 22.

Typically, the plunger 34 is actuated, via the open end of plunger bore 30, based on input from a camshaft 35 of the internal combustion engine.

Inlet valve assembly 38 is configured to selectively allow fuel, arriving from damper 24 via a fuel supply channel 46 in body 28 and in communication with inlet conduit 36, to enter pumping chamber 32. That is inlet valve assembly is configured to control the flow of inlet fuel to the compression chamber and to close at predetermined moments during the compression stroke to allow pressure build-up.

Outlet valve assembly in turn, selectively allows fuel to be discharged from pumping chamber 32, towards fuel rail 44. Conventionally, outlet valve assembly is designed as check valve, i.e. allowing only one-way flow.

In operation, reciprocation of plunger 34 causes the volume of compression chamber 32 to increase during an intake stroke of plunger 34 (downward as oriented in FIG. 1) in which a plunger return spring 31 causes plunger 34 to move downward, and conversely, the volume of compression chamber 32 decreases during a compression stroke (upward as oriented in FIG. 1) in which the camshaft 35 causes plunger 34 to move upward against the force of plunger return spring 31. In this way, fuel is drawn into compression chamber 32 during the intake stroke, and conversely, fuel is pressurized within compression chamber 32 by plunger 34 during the compression stroke, depending on the state of operation of inlet valve assembly 38, and discharged through outlet valve assembly 42 under pressure to the fuel rail and fuel injectors. Conventionally, a pressure relief valve assembly (not shown) is arranged in the fuel pump housing 28 downstream of outlet valve assembly 42 in order to provide a fluid path back to compression chamber 32 if the pressure downstream of outlet valve assembly reaches a predetermined limit which may pose an unsafe operating condition if left unmitigated.

As will be described below, inlet valve assembly 38 is typically actuated electromagnetically. An electronic control unit 100 may be used to supply electric current to the inlet valve coil to control the pump duty cycles. ECU 100 may receive input from a pressure sensor 102 which senses the pressure within fuel rail 44 in order to provide a proper duty cycle to coil in order to maintain a desired pressure in fuel rail 44 which may vary based on the commanded torque desired to be produced by internal combustion engine 12.

Figure 2:
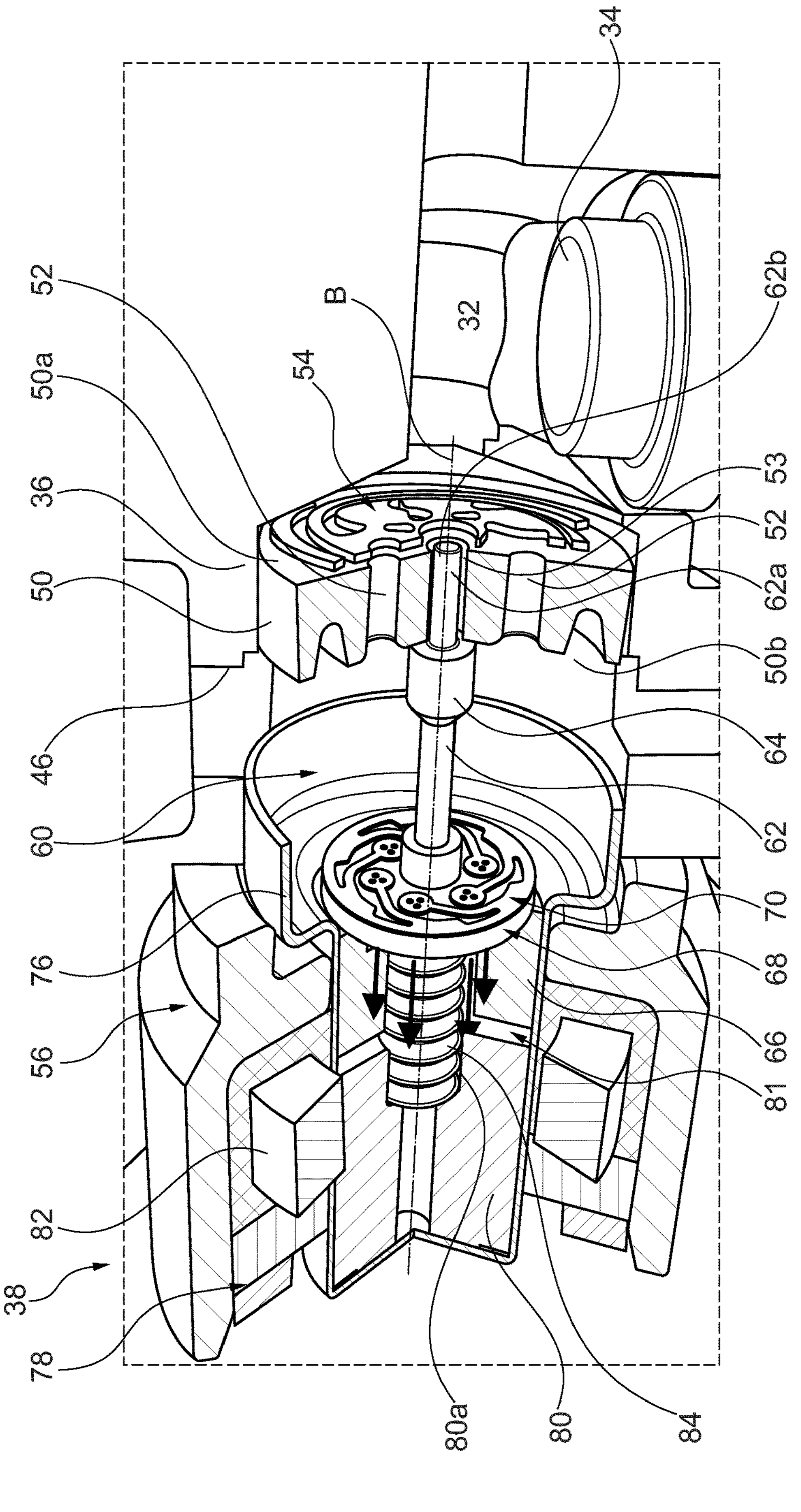
FIG. 2: is a principle cut-out view of the inlet valve assembly.

The general design of the inlet valve assembly 38 (which may also be referred to as spill valve) will now be explained with reference to FIG. 2, where one will recognize inlet conduit 36, fuel supply channel 46, compression chamber 32 and plunger 34. Inlet valve assembly 38 comprises a seat member 50 arranged inside inlet conduit 36 towards compression chamber 32. The seat member 50 obturates the flow from the inlet conduit 36 towards the compression chamber 32, except through one or more outlet passages 52 provided therein. More specifically, seat member 50 is generally disc shaped and comprises a first side 50*a*, facing the compression chamber 32 and an opposite rear side 50*b*. The seat member 50 is dimensioned (namely its diameter) such that its peripheral edge fits tightly in the section of inlet conduit near the compression chamber 32, to provide a fluid tight interference fit mounting. The seat member 50 here comprises a set of outlet passages 52, e.g. 4 to 8, formed by though holes extending trough the thickness of the seat member and fluidly connecting the first side 50*a* to the second side 50*b*. The outlet passages 52 are circumferentially distributed, in a regular manner; however other designs may be applied. The seat member 50 further comprises a central passage 53 for an actuating needle, as will be explained later.

Reference sign 54 designates a valve member, hereinafter referred to as shutter, cooperating with the first side 50*a* of the seat member 50. In FIG. 2 the shutter 54, which is formed as a flat cover element, is shown in its seated position. The shutter 54 lies on the first side 50*a* of valve seat 50 and obturates the outlet passages 52.

Figure 3:
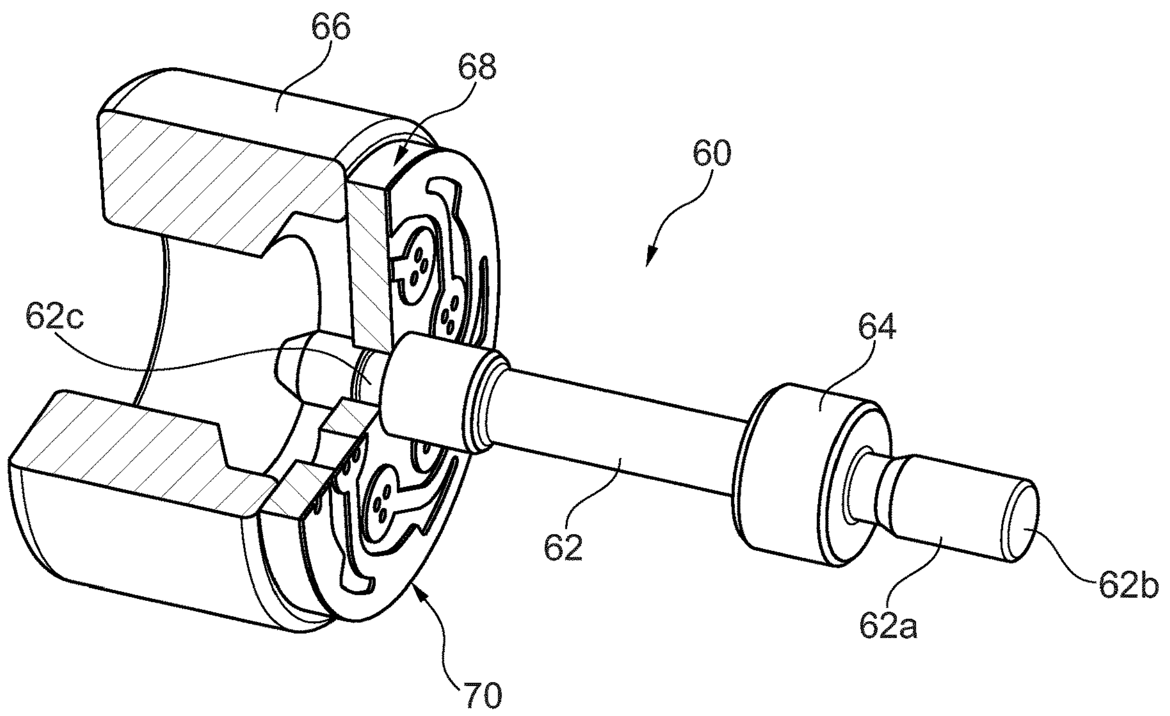
FIG. 3: is a view of the needle assembly.
Figure 4:
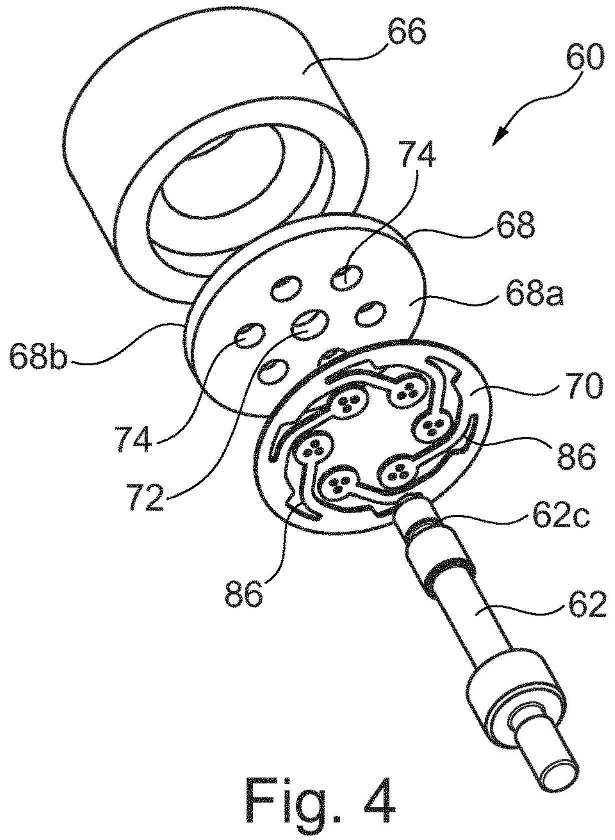
FIG. 4: is an exploded view of the needle assembly

Actuation of shutter 54 is performed by means of an actuator assembly 56, disposed upstream of valve seat 50, which comprises a needle assembly and solenoid assembly. Needle assembly 60, shown in detail in FIGS. 3 and 4, comprises a needle 62 (rod-like member) extending along an actuating axis B aligned with the central passage 53 in valve seat 50. In practice, axis B is coaxial with the central axis of inlet conduit 36 and preferably substantially perpendicular to valve seat 50. In use, needle 62 has a first end 62*a* engaged within the central passage 53 and comprises a protruding annular collar 64. The distance between the annular collar 64 and the tip 62*b* of the needle is greater than the axial length of the central passage 53. Hence, when the needle collar 64 is in abutment against the second side 50*b* of the seat member 50, the needle end 62*a* protrudes on the first side 50*a* of the valve seat 50, lifting off shutter 54: this is the unseated position of shutter 54, in which fuel can flow through seat member 50 into the compression chamber 32. This configuration is not shown in FIG. 2.

Needle assembly 60 further includes an armature 66, a washer 68 and a blade member 70, all assembled with needle 62. As will be understood, blade member 70 provides the function of obturating member. Needle assembly 60 thus behaves as a single, integral piece. In the embodiment, washer 68 is assembled to the needle 62; it is force-fitted into an annular groove 62*c* at the basis of the needle 62, opposite the front end 62*a*. In addition to a central passage 72 for needle 62, washer 68 includes a number of through holes 74 extending in the thickness direction of the washer 68 and hence fluidly connecting the first side 68*a* of the washer (facing valve seat 50) to its opposite second side 68*b*. In this embodiment washer 68 comprises six through holes 74.

Washer 68 is attached, by its second side 68*b*, e.g. by welding, to the annular-shaped armature 66. Armature 66 is guided in a housing (or body) 76, allowing movement of the armature 66 along axis B and hence of needle assembly 60.

The solenoid assembly 78 includes an annular pole piece 80 disposed at the rear of armature 66 in the housing 76 and is surrounded by a coil 82.

The needle assembly 60 is elastically biased towards the seat member 50. Here a compression spring 84 is arranged inside the armature 66 and received in a central section 80*a* of pole piece 80.

It follows that, in the rest position of the valve assembly 38, i.e. when the coil 82 is not energized, the needle assembly 60 is biased into abutment against the valve seat 50, whereby the needle 62 protrudes on the first side 50*a* of the valve seat and hence maintains the shutter 54 in the unseated position. The inlet valve assembly is thus, by default, open. In this configuration, pole piece 80 and armature 66 are axially spaced, whereby an air gap 81 exists.

Energizing coil 82 will create a magnetic field that attracts the armature 68 of the needle assembly 60, which is thus pulled towards the pole piece 80. As a result, the needle 62 is retracted and no longer protrudes on the first side 50*a* of the valve seat. The shutter 54 can thus move to the seated position: the inlet valve assembly is closed. This is configuration shown in FIG. 2. The air gap 81 between pole piece 80 and armature 66 is reduced.

It will be noted that the combination of washer 68 and blade member 70 provides a breaking/slowing effect when the needle assembly 60 moves under the action of the spring 84 towards the seat member 50.

Figure 5A:
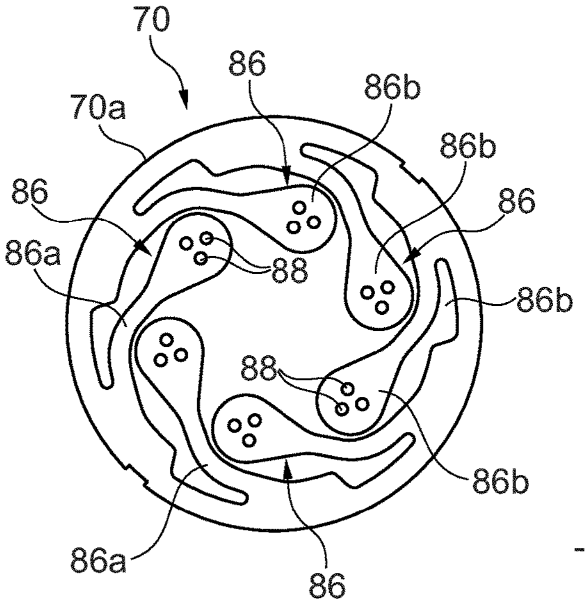
FIG. 5A: is view of the blade member.

The blade member 70, seen alone in FIG. 5A, comprises a plurality of flexible blades 86 that extend from a base circle 70*a*, which is fixed to the first side 68*a* of washer 68, e.g. by welding. The blades 86 are not attached to washer 68 and comprise a flexible stem 86*a* connected at one end to the base circle 70*a* and at the other end to an obturating pad 86*b*. Each pad 86*b* is configured to close a respective hole 74 in washer 68. However, each pad 86*b* includes a plurality of openings 88. That is, the pad 86*b* can be traversed by fuel when resting on the washer 68 and closing the associated though hole 74. As will be understood, the flow cross-section of each pad opening 88 is considerably smaller than that of the holes 74 in washer 68. For example, the cumulative flow cross-section of the openings 88 in a single pad 68*a* may represent less than 70%, in particular less than 60, 50, 40 or 35% than the flow cross-section through the corresponding hole 74.

As indicated above the blades 86 have a flexible stem 86*a*, which allows the blades to raise from washer 68 when the needle assembly moves in body 76, resp. inlet conduit 36. In use, needle assembly 60 is immerged in fuel. The fuel supply channel 46 opens into the inlet conduit 36 at an intermediate position between valve member 50 and washer 68.

As will be understood, when the needle assembly 60 moves towards the pole piece 80 (to the left of FIG. 2), the blades 86 will lift off from the washer 68 and uncover holes 74, thus allowing for a maximum flow cross-section through washer 68. Conversely, when the needle assembly 60 moves towards the seat member 50 (i.e. to the right), the blades 86 will be forced by the fuel against the washer first side 68*a* and close the holes 74; fuel can only flow through the openings 88 in the pads 86*b*. A reduced flow cross section is thus offered by the needle assembly 60. As a result, the blades 86, when the needle assembly 60 moves axially from left to right, will close the holes 74 in the washer, thereby offering a greater flow resistance and hence slowing down the needle assembly 60. This reduces the speed of the needle assembly 60 when moving towards the open position of the inlet valve, in abutment against valve seat 50. By contrast, the needle assembly 60 will move at greater speed from right to left, i.e. in closing direction, when attracted by the magnetic field generated via the solenoid coil 82.

The present needle assembly 60 is designed to limit flow of particulate matter from the fuel inlet region close to the valve seat 50, towards the actuator region. For this purpose, instead of a single opening with a diameter D1, each pad is provided with a plurality of openings having a comparatively smaller diameter D2.

In the embodiment of FIG. 5A, the blade member 86 comprises arcuate stems 86*a* and pads 86*b* having a generally circular shape, connecting to the stem via an intermediate taper section. The pads 86*b* in this embodiment comprise each three circular openings 88.

Figure 6:
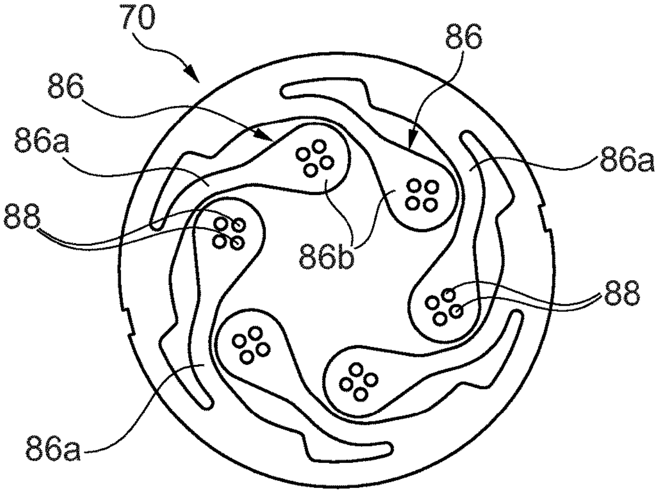
FIG. 6: is view of an alternative blade member.

The embodiment of FIG. 6 is similar to FIG. 5A, except that the pads comprise four openings.

Figure 5B:
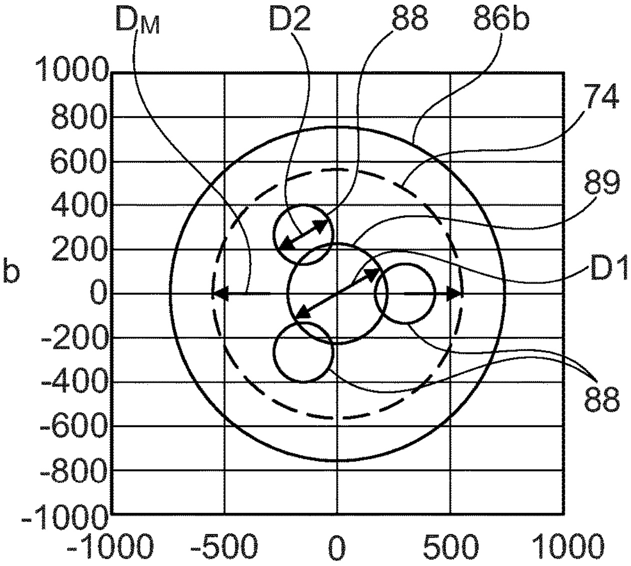
FIG. 5B: is a diagram illustrating the layout of the pad openings with respect to the washer hole.

FIG. 5B illustrates the arrangement of the three openings 88 relative to the hole 74 in the washer 68 having a diameter $D_H$. As can be seen, all three openings 88 are positioned within the circumference of hole 74. For the sake of explanation, a single hole 89 is represented, with diameter D1=450 μm. In this variant, it is considered that three openings 88 with a diameter D2 between 250 and 270 μm, in particular about 260 uμm, can provide an equivalent behavior of the blade element.

With four openings 88, as in the embodiment of FIG. 6, the openings may have a diameter D2 in the range 220 to 230 μm, in particular 225 μm.

The selection of a smaller opening diameter permits filtering/blocking small particles having a diameter below D1 and larger than D2. The diameter D2 is selected in consideration of the particle diameter to be blocked. Of course, the pad must allow for a certain flow cross-section for the functionality of the inlet valve 38. Therefore, a plurality of openings is considered necessary. According to a possible design, the diameter D2 of the openings is determined to provide an equivalent flow behavior as a single opening configuration.

By design, the cumulated flow cross-section through openings 88 with diameter D2 represents a fraction of the flow cross-section through hole 74 with diameter $D_H$.

Figure 7:
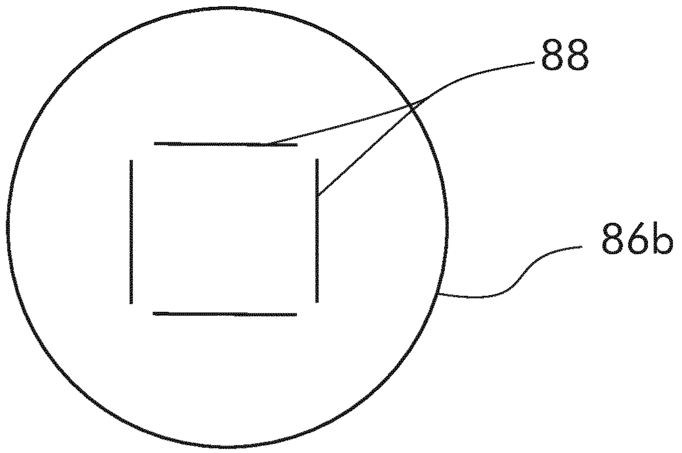
FIGS. 7 to 9: are views of still other variants of the blade member.
Figure 8:
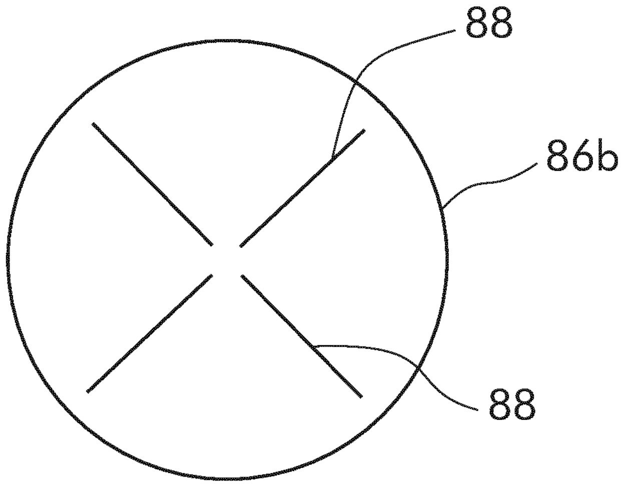
Figure 9:
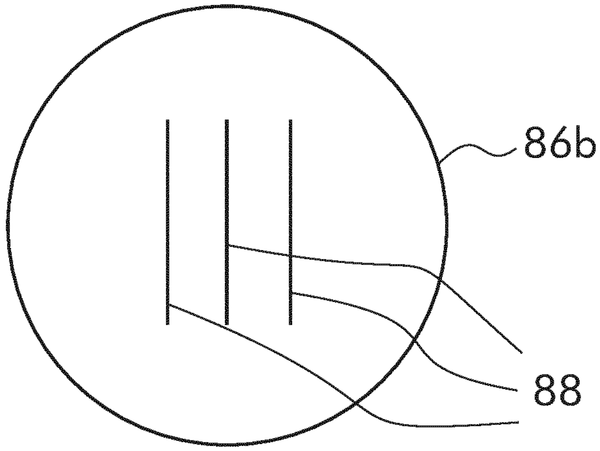

FIGS. 7 to 9 show other concepts of pad design, where the openings take the form of through slits in the pad. As can be seen, a set of 3 or 4 straight slits can be used, disposed either in a square, as a cross, or in a parallel fashion.

The flow dimensions, resp. flow cross-section, of the slits 88 is determined with respect to the desired flow behavior. The use of slits permits further reducing the size of particles flowing through pads.

The invention claimed is:

1. A fuel pump for a gasoline direct injection fuel equipment of an internal combustion engine, comprising:
- a housing provided with a pumping bore extending along a pumping axis and defining, at an end, a compression chamber which volume is cyclically varied by a piston reciprocating in said pumping bore;
- an inlet passage in said housing in communication with a fuel supply passage;
- an outlet passage in said housing, in which an outlet valve assembly is arranged and selectively discharges high pressure fuel;
- an inlet valve assembly arranged in said inlet passage and configured to selectively allow low-pressure fuel to enter said compression chamber;
- wherein said inlet valve assembly comprises:
- a check valve comprising a seat member with at least one outlet passage therethrough cooperating with a valve member moveable between a seated position preventing flow through said at least one outlet passage and an unseated position permitting flow through the latter;
- an actuator assembly comprising an actuating needle reciprocally moveable by means of a magnetic field to actuated said valve member between said seated and unseated positions, wherein said actuating needle is part of a needle assembly including an armature, a washer with a plurality of through holes and an obturating member,
- wherein said obturating member comprises a plurality of flexible blades, each blade comprising an obturating pad configured to be moveable between a rest position, wherein said obturating pad rests on said washer and closes a respective through hole thereof, and a raised position, raised from said washer when said needle moves away from said check valve,
- wherein each obturating pad comprises a plurality of openings, the cumulative cross-sections of the openings in a respective pad representing a fraction of the flow cross-section through the respective hole in the washer.

2. The fuel pump according to claim 1, wherein the cumulative cross-section of the openings in a respective pad represents less than 70% of the flow cross-section through the respective hole.

3. The fuel pump according to claim 1, wherein each opening in the pad is dimensioned to block passage of particles with a diameter from 280 μm and greater.

4. The fuel pump according to claim 1, wherein the openings in the pad have a diameter of less than 320 μm.

5. The fuel pump according to claim 1, wherein the openings in said pad have a diameter in the range of 170 to 300 μm.

6. The fuel pump according to claim 1, wherein each pad comprises three openings with a diameter of about 250 to 270 μm.

7. The fuel pump according to claim 1, wherein each pad comprises four openings with a diameter of about 220 to 230 μm.

8. The fuel pump according to claim 1, wherein each pad comprises five openings with a diameter of about 190 to 210 μm.

9. The fuel pump according to claim 1, wherein the pads comprise a number of slit-shaped openings distributed on the pad.

10. The fuel pump according to claim 9, wherein the slit-shaped openings are disposed in a parallel manner, or in a square or cross.

11. The fuel pump according to claim 9, wherein the slit-shaped openings are straight or curved and present a width of less than 50 μm.

12. The fuel pump according to claim 1, wherein the obturating member comprises a base portion fixed to the washer, wherein each pad is attached to the base portion by a flexible stem.

13. The fuel pump according to claim 12, wherein the base portion is annular and extends peripherally on the washer, surrounding the holes therein.

14. The fuel pump according to claim 1, wherein the obturating member is attached to the washer on the side thereof facing check valve.

15. The fuel pump according to claim 1, comprising a spring biasing said needle assembly towards said valve seat in order to maintain said valve member in unseated position; and a solenoid assembly with a coil surrounding a pole piece, configured to selectively generate a magnetic field adapted to attract the armature and hence pull the needle assembly away from the seat member to bring the valve member in seated position.

* * * * *